United States Patent [19]

Endo et al.

[11] Patent Number: 4,514,645
[45] Date of Patent: Apr. 30, 1985

[54] POWER SUPPLY SYSTEM FOR AUTOMOTIVE PARTS HAVING A ROTARY COMPONENT

[75] Inventors: Akira Endo, Mito; Akira Hasegawa, Katsuta; Takanori Shibata, Hitachi, all of Japan

[73] Assignee: Hitachi, Ltd., Tokyo, Japan

[21] Appl. No.: 467,802

[22] Filed: Feb. 18, 1983

[30] Foreign Application Priority Data

Feb. 19, 1982 [JP] Japan ................... 57-24482

[51] Int. Cl.³ .............................. H02G 3/00
[52] U.S. Cl. .................. 307/10 R; 307/115; 307/151; 340/58; 340/825.62; 340/825.72
[58] Field of Search ............ 307/10 R, 10 BP, 151, 307/113, 115; 336/123; 340/58, 825.62, 825.72; 323/216, 264, 348; 363/22, 23, 145; 310/68 D

[56] References Cited

U.S. PATENT DOCUMENTS

| | | | |
|---|---|---|---|
| 3,422,339 | 1/1969 | Baker | 363/145 |
| 3,670,174 | 6/1972 | Sakakibara | 307/10 R |
| 3,671,758 | 6/1972 | Suzuki | 307/10 R |
| 3,878,721 | 4/1975 | Nath | 336/123 X |
| 3,979,659 | 9/1976 | Lynch, Jr. et al. | 363/145 |
| 4,319,315 | 3/1982 | Keeney, Jr. et al. | 362/22 |
| 4,334,428 | 6/1982 | Fima et al. | 340/58 X |
| 4,404,559 | 9/1983 | Renner | 336/123 X |
| 4,405,924 | 9/1983 | Shinoda et al. | 307/10 R |

Primary Examiner—A. D. Pellinen
Assistant Examiner—Derek S. Jennings
Attorney, Agent, or Firm—Antonelli, Terry & Wands

[57] ABSTRACT

A system for supplying power to automotive parts having a rotary component in which a pair of circular coils are disposed in opposition to each other around a rotary shaft of a rotor. One coil is fixed on rotor side, and the other coil is fixed on stator side, thereby forming a DC/DC converter. The rate of magnetic coupling between the coils is constant against the rotation of the coil on rotor side so that stable power is supplied efficiently to devices on rotor side in contactless fashion.

10 Claims, 26 Drawing Figures

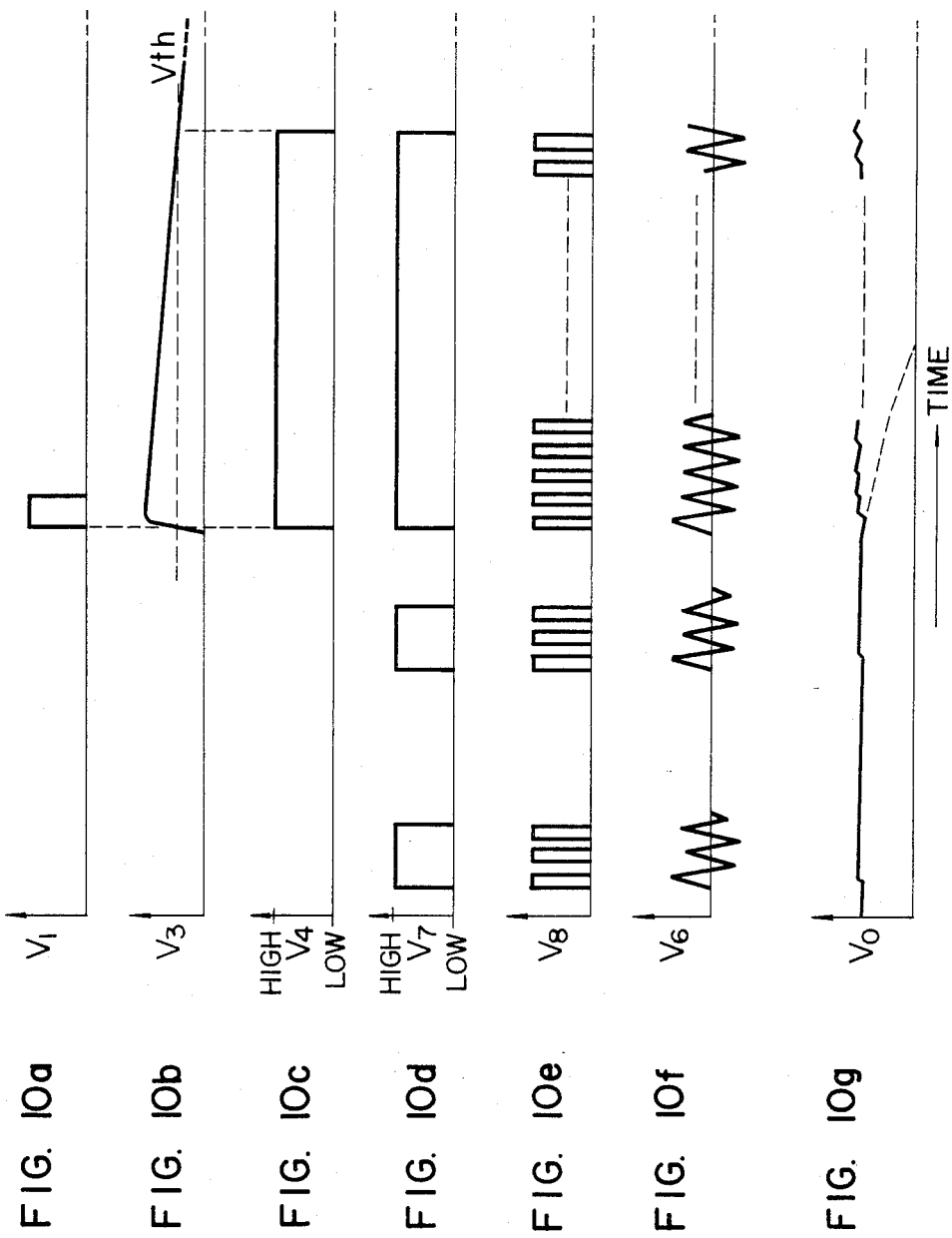

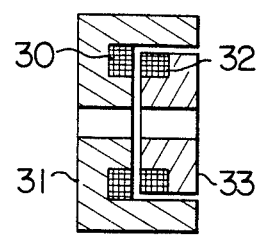
FIG. 11a
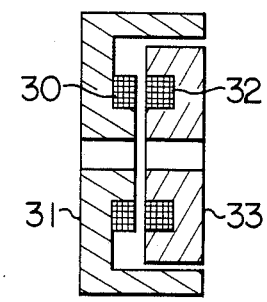
FIG. 11b
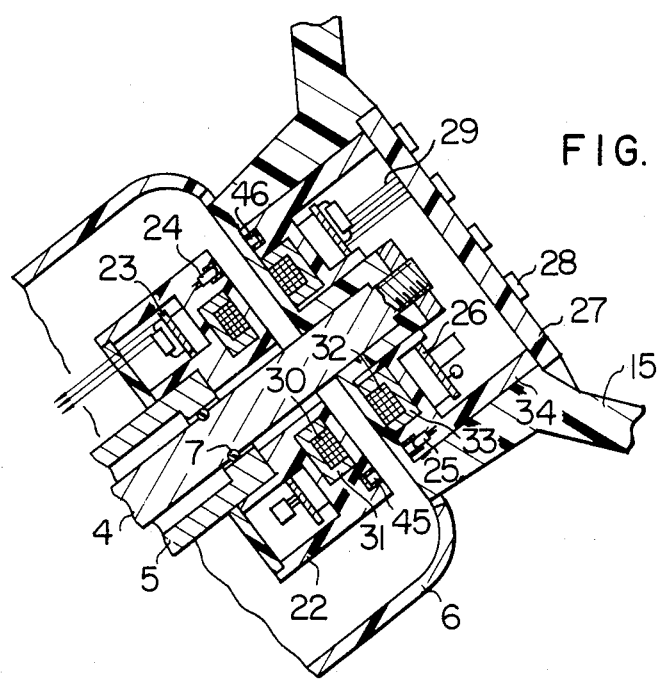
FIG. 12
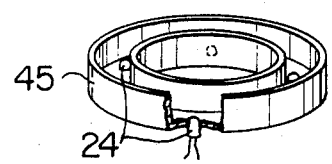
FIG. 13

POWER SUPPLY SYSTEM FOR AUTOMOTIVE PARTS HAVING A ROTARY COMPONENT

The present invention relates to a power supply system, and, more more particularly, to a power supply system suitable for supplying power to automotive parts having a rotary components.

BACKGROUND OF THE INVENTION

A power supply system for automotive parts having a rotary component such as, for example, a steering column, as well as for a tire pressure alarm have been proposed wherein the power supply is effected by d slip ring and a brush.

While the proposed power supply systems are simple in construction, by virtue of the fact that the power is supplied by a sliding between a slip ring and a brush, a disadvantage resides in the fact that there is a generation of electrical noise or a contact failure thereby leading to a false actuation of the system or an inferior wear resistance.

In addition to the problem of wear resistance, a further disadvantage of proposed power supply system resides in the fact that there is a demand for a switch construction which enables a control of a plurality of signals such as, for example, the turning on of a headlight, a wiper system, and the like from a steering wheel of a vehicle. If such a switch is incorporated into a conventional system, the slip ring is required to be used in a number of ways thereby leading to problems which include cost, size, electrical noise, and realiability.

In order to cope with the last mentioned disadvantage, a multiple transmission system based on a time sharing has been developed. However, a disadvantage of a multiple transmission system in which a slip ring involves only a power line and a signal line, resides in the fact that such system is easily affected by external noises due to the higher frequency of the signals processed including the electrical noise caused in the slip ring of the power line and the chattering generated in the slip ring of the signal line.

Efforts have been made to eliminate the use of lead wires by, for example, using light or electromagnetic induction for signal transmission of rotary components. However, unless the lead wires for the power lines are eliminated, the realiability and endurance of the transmission system are adversely affected thereby making the wireless transmission of signals useless. This is especially a practical problem in a tire pressure alarm which has been developed for use without needing wires and which includes a dry cell battery as a power supply of the transmission device on the tire side by virtue of a discharge of the power supply battery.

Accordingly, it is an object of the present invention to provide a realiable and durable power supply system for automotive parts having a rotary component which avoids, by simple means, shortcomings and disadvantages encountered in the prior art.

In accordance with advantageous features of the present invention, a power supply system is provided in which a pair of coils are opposed to each other around a rotary shaft of a rotary section, with one of the coils being secured to the rotary section and the other coil being secured to a stationary element. The two coils form a DC/DC converter so that, taking advantage of the fact that the degree of magnetic coupling of the coils is maintained constant against a rotation of the coil on the rotary side, a stable power is efficiently supplied to the system on the rotary side in a contactless manner.

BRIEF DESCRIPTION OF THE DRAWINGS

FIGS. 10a to 10g are timing charts for the circuit of FIG. 9;

FIGS. 11a and 11b are cross sectional views showing shapes of the core of the power supply system according to other embodiments of the present invention;

FIG. 12 is a partially schematic cross sectional view of another embodiment of the present invention including a modification of the signal transmitter-receiver thereof; and FIG. 13 is a perspective view of a detail of the the embodiment of FIG. 12.

DETAILED DESCRIPTION

Figure 1:
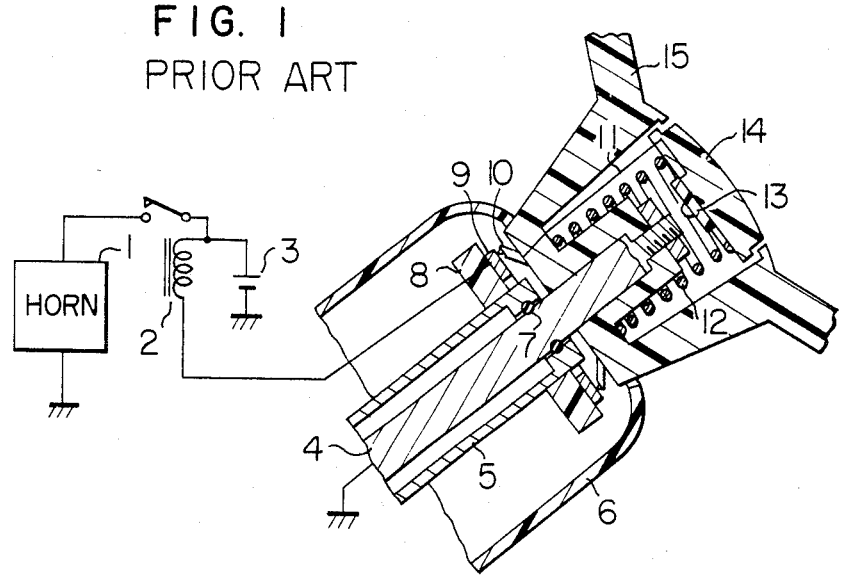
FIG. 1 is a partially schematic cross sectional view of a conventional steering column.

Referring now to the drawings wherein like reference numerals are used throughout the various views to designate like parts and, more particularly, to FIG. 1, according to this figure, a conventional steering column includes a steering wheel 15, forming a rotary component and a horn button 14 normally urged upward by a spring 12, with the horn button 14 carrying a contact plate 13 connected with a brush 10 through a wire 11. The brush 10 is in contact with an annular slip ring 9 disposed on an insulating plate 8 mounted on a steering column tube 5 on an outer periphery of a steering shaft 4. The slip ring 9 is constructed such that, when the horn button 14, mounted on the steering wheel 15, rotates with the steering wheel 15, the connection between the horn relay 2 connected with the slip ring 9 and the contact plate 13 is maintained. A steering cover 6 is mounted on the outer periphery of the steering column tube 5, and the horn relay 2 is connected with a battery 3, which, in turn, is connected to a horn 1 through a horn relay contact.

Figure 2:
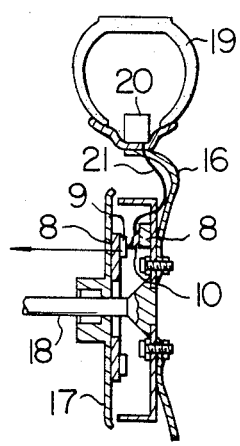
FIG. 2 is a partially schematic cross sectional view of a conventional tire air pressure alarm and a tire.

As shown most clearly in FIG. 2 a conventional tire air pressure alarm includes a pressure sensor 20, mounted in a tire 19, is connected to a brush 10' through a wire along a wheel hub 16 for supporting the tire 19. The brush 10' is in contact with a slip ring 9' on an insulating plate provided on a bracket 17 mounted on a drive shaft 18. The slip ring 9' is kept in contact with the brush 10' during the rotation of the tire 19.

Figure 3:
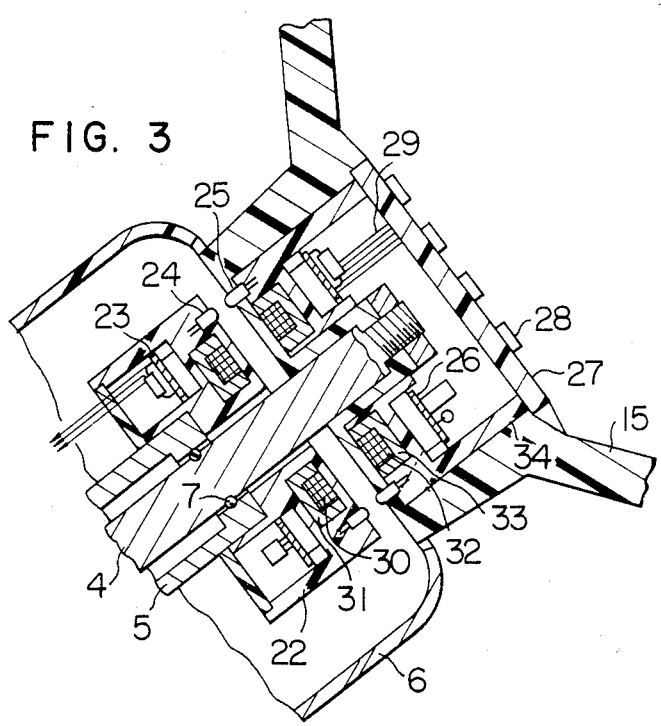
FIG. 3 is a partially schematic cross sectional view of a steering column according to the present invention.

As shown in FIG. 3, a steering shaft 4 is fixed to a car body (not shown) by a steering column tube 5, and a steering wheel 15 is mounted at the end of the steering shaft 4. A pot-shaped rotor core 33 of a magnetic material such as, for example, a ferrite material is arranged around the steering shaft 4 on the steering wheel side (hereinafter referred to as the rotor side). A stator core 31, disposed in opposition to the rotor core 33, is also arranged around the steering shaft 4 on the stationary side (hereinafter referred to as the stator side). The rotor core 33 has a rotor coil 32 wound thereon, and the stator core 31 has the stator coil 30 wound thereon. The rotor core 33 is fixed by a rotor mold case 34 of resin or the like, which contains a rectifier section for rectifying and converting an AC voltage generated in the rotor coil 32 into a DC voltage, and a control circuit 26 for sending out a serial signal of a pulse switch 28 from an LED (light-emitting diode) 25, with the push switch 28 being arranged in a keyboard 27 mounted on the steering wheel 15. On the stator side, a stator mold case 22 similarly contains a drive circuit for driving the stator coil 30 in AC fashion and a drive circuit 23 for processing the optical signal received from the rotor side by a photo transistor 24. Instead of light as communication means, electromagnetic induction, ultrasonic wave or other means capable of transmitting signals without lead wires may be used with equal effect.

Figure 4:
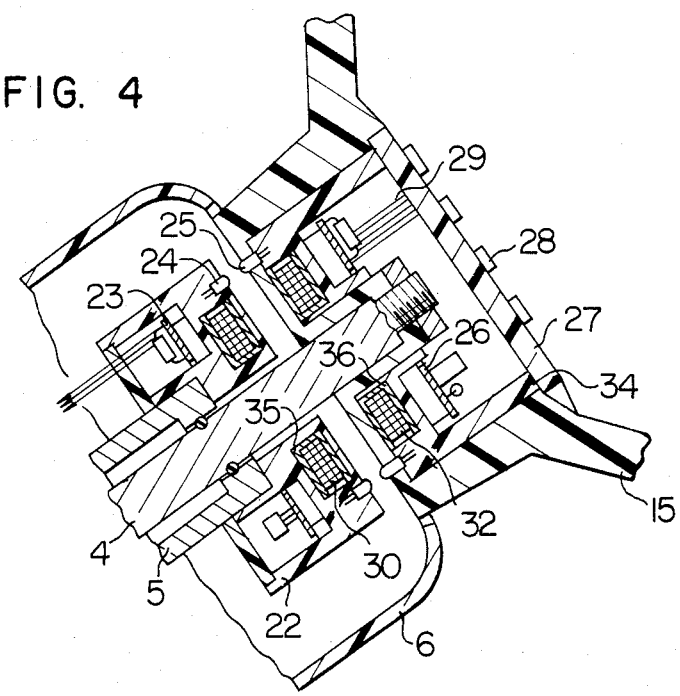
FIG. 4 is a partially schematic cross sectional view schematically of a steering column according to another embodiment of the present invention.

In the embodiment of FIG. 4, the rotor core 33 and the stator core 31 of FIG. 3 are eliminated so that the coupling efficiency between the coils is less, thus reducing the power transmission efficiency. Nevertheless, as far as less power is supplied to the rotor side, this construction is possible and lower in cost. It is obvious that the distance between the rotor coil 32 and the stator coil 30 in FIGS. 3 and 4, which is, for example about 1 mm, should be as short as possible in order to increase the coupling efficiency of the magnetic fields.

Figure 5:
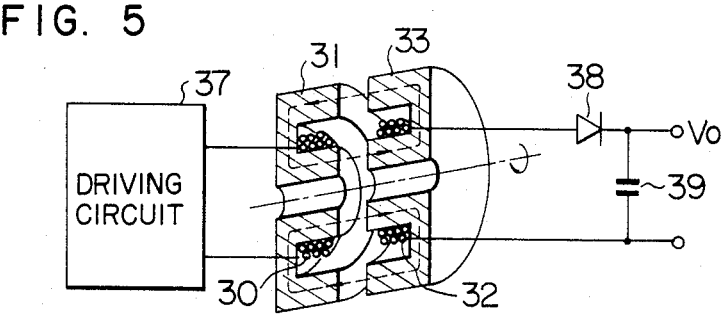
FIG. 5 is a partially schematic cross sectional view of a power supply according to the present invention.
Figure 6:
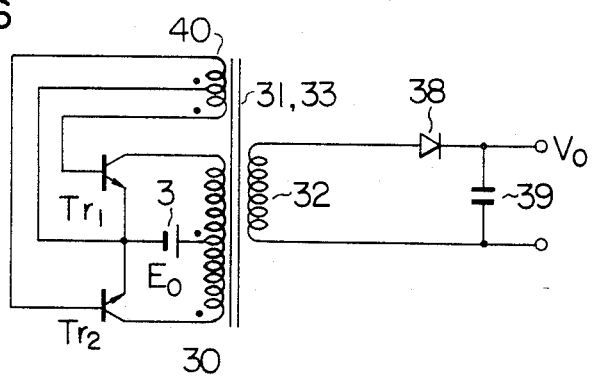
FIG. 6 is a circuit diagram of a general converter.

As shown by the phantom line in FIG. 5, the magnetic paths of the two coils 30, 32 undergo no structural change by the rotation of the rotor core 33, resulting in the coupling degree of the magnetic fields being unchanged. In order for the rotor core 33 and the stator core 31 to function as a DC/DC converter, it is necessary to convert the DC voltage of the automotive battery into an AC voltage and apply it to the stator coil 30. This requires a driving circuit 37, and a rectifier circuit including a rectifying diode 38 and a capacitor 39 for converting the AC voltage generated in the rotor coil 32 into a DC voltage. FIG. 6 shows an example of the circuit suitable as the DC/DC converter, which is called the Royer's circuit. In applying this circuit to the present invention, a control coil 40 is additionally wound to the stator coil 30 thereby making a self-excited oscillation possible. Various other circuits are available as the DC/DC converter and may be used for the same purpose. Further, various modifications of the shape of the cores including those shown in FIGS. 11a and 11b are conceivable in order to increase the coupling efficiency of the magnetic fields. Apart from the power supply system explained above for the steering device, a similar system may be used for the tire air pressure alarm.

When power is transmitted by transformer coupling as in the present invention, an excitation loss naturally occurs. Although the above-described embodiment does not pose any problem in the case of a tire air pressure alarm or the like which is operated only when the ignition key of the automobile is turned on, it is necessary to continue to supply power to the system on rotor side even when the ignition key is turned off in the case of the horn switch of the steering device which is desirably operated in the off state of the ignition key, resulting in the battery being consumed unnecessarily. If the device on rotor side is comprised of integrated circuits such as CMOS involving a small operating current, the power consumption of the device is easily controlled to about 1 mA. However, the problem of the excitation loss of the transformer still remains unsolved.

The optical communication using an LED generally requires a drive current of about 20 mA which, in turn, requires a transformer of a sufficient capacity to transmit the current. The excitation loss of a transformer in a closed loop is generally approximately 20% of the power supplied. This loss figure possibly increases to about 50% for the system having a gap between the cores as in the present invention. Therefore, if the system according to the invention is maintained in an actuated state when the ignition key is off, a current of about 20 mA is required as the excitation loss, depending on the a construction of, for example, the core shape and gap between the cores, with the result being that a battery of about 35 Ah in capacity will discharge within two months.

Figure 7:
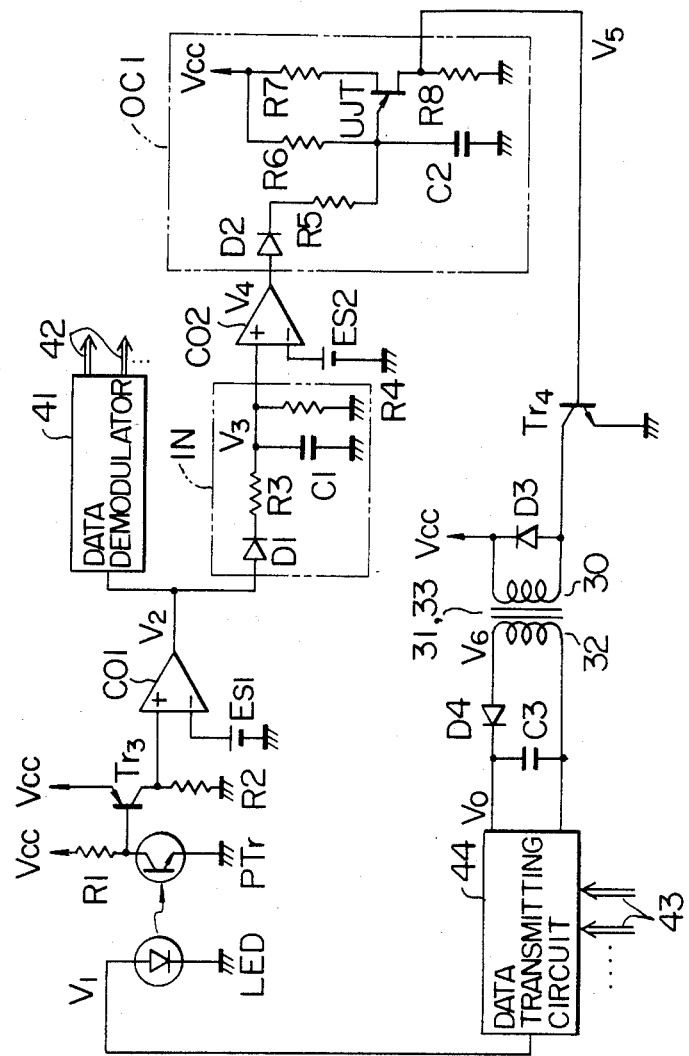
FIG. 7 is another embodiment of a circuit according to the present invention.
Figure 9:
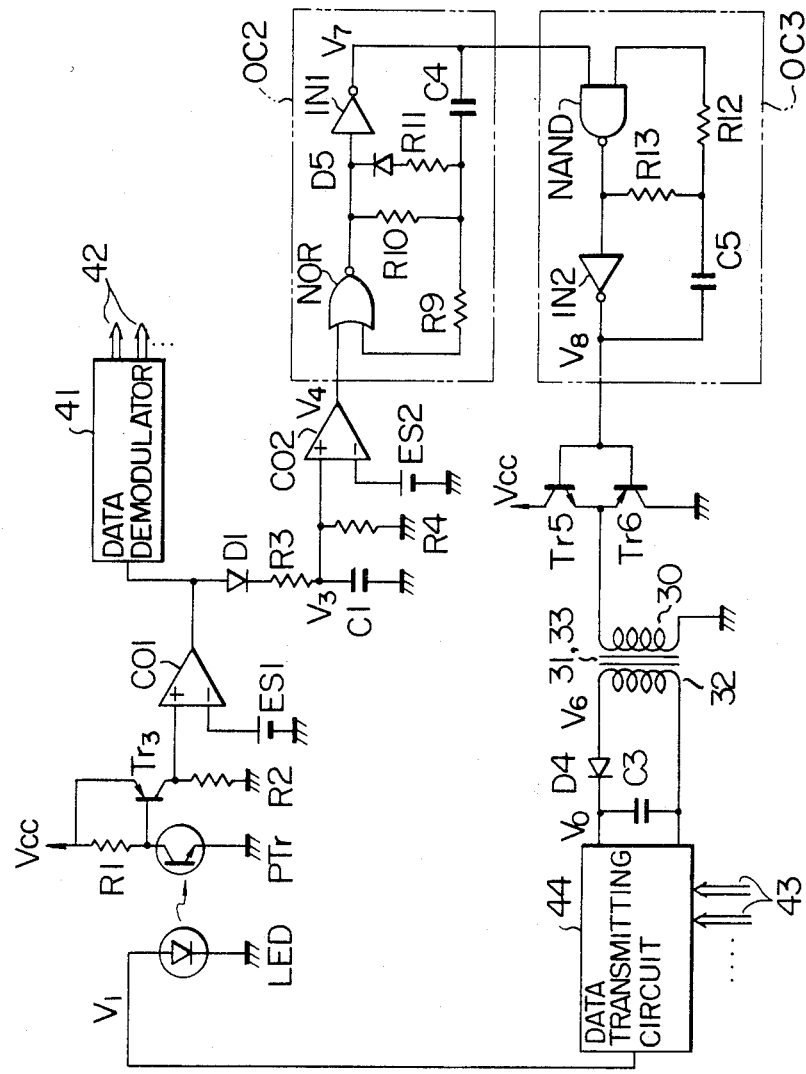
FIG. 9 is another embodiment of a circuit according to the present invention.

To avoid the last mentioned problem, as shown in FIGS. 7 or 9, it is possible to provide a system which takes advantage of the fact that, under stand-by conditions in the absence of an input signal, that is, under normal conditions, the drive current of the LED is reduced to zero and, therefore, an operating current of only about 1 mA is required for the control circuit 26. Normally, therefore, the transformer is excited to such an extent that the power of about 1 mA in terms of current is supplied; whereas, in the presence of a light input, a large current begins to be supplied.

Figure 8:
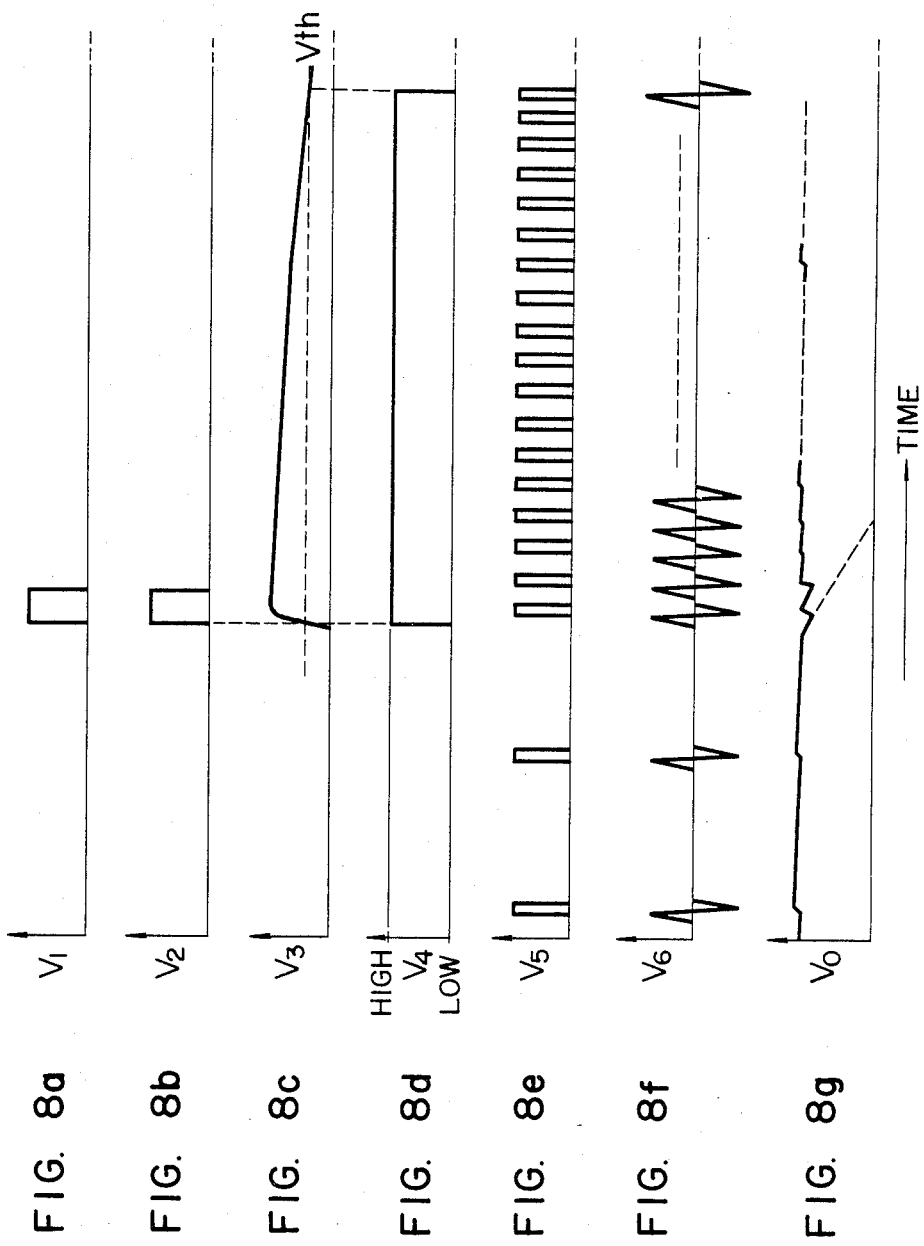
FIGS. 8a to 8g are timing charts for the circuit of FIG. 7.

As shown in FIG. 7, a uni-junction transistor UJT generates a pulse with a duty factor of about 1% and a long period of about one second, which pulse is used to excite the stator coil 30, whereby power is supplied to a data transmission circuit on the rotor side. The data transmission circuit 44 is of a well-known construction including, for example a CMOS or the like. Upon application of a data input 43 such as a horn signal or a headlight turn-on signal to the data trasmission circuit 44, the LED is driven, so that a large current flows to thereby discharge the capacitor C3, thus causing the source voltage $V_0$ to be sharply reduced. The light emitted by the LED is received by the photo transistor PTr on the stator side, shaped to a pulse waveform at a comparator CO1, and then at an integrated circuit section IN, shaped into the waveform as shown by $V_3$ of FIG. 8(C). This voltage $V_3$ is applied to a comparator CO2 with the threshold level of Vth. Even after the optical signal is extinguished, the output of the comparator CO2 remains "high" for a predetermined time and reduces the time constant of the oscillator circuit of the uni-junction transistor UJT, so that the number of excitations of the stator coil 30 is increased to thereby prevent the supply voltage $V_0$ from being decreased. By doing so, only a small current is normally required or during the time when the duty factor is about 1%, while the drive current of about 20 mA is applied only when an input signal is obtained, with the result being that the average current of about 0.2 mA is involved, thus solving the problem of the power of battery being unnecessarily consumed.

The circuit of FIG. 9 is for duty factor control similar to the circuit of FIG. 7 but employs a different construction of the oscillator circuit, which operates in the following manner.

As shown in FIGS. 9 and 10a–10g, the oscillator circuit OC2 oscillates when the output $V_4$ of the comparator CO2 is "low", at which time the duty factor is about 1% and the output $V_7$ of the oscillator circuit OC2 is "low". When the output $V_4$ is "high", the oscillator circuit OC2 stops oscillating, when the output $V_7$ is raised to "high". The oscillator circuit OC3, on the other hand, oscillates when the output $V_7$ is "high". Under this condition, the duty factor is about 50%. When the output $V_7$ is "low", the oscillator circuit OC3 stops oscillating. Thus, when the output $V_4$ is "low", that is, under a stand-by condition in the absence of the input signal, the oscillator circuit OC2 oscillates at the duty factor of approximately 1%, while in response to an input signal, the output $V_4$ is raised to "high" state to thereby stop the oscillation of the oscillator OC2. The oscillator OC3 then oscillates at the duty factor of about 50%.

Apart from the system shown in FIGS. 7 and 9, a system for controlling the voltage applied to a transformer may be used in view of the fact that the excitation loss of the transformer is substantially proportional to the square of the input voltage of the transformer.

A transmitter/receiver of the optical signal may, as shown in FIG. 12, include an annular recess 45 formed on the stator side and having a surface of a light reflecting material including at least one photo-transistor 24. Another annular recess is formed on the rotor side and has a surface of an optical reflecting material including an LED 25. This construction increases the accuracy of receiving the optical signal or reduces the number of the phototransistors 24. Experiments have shown that a sufficient optical signal is obtained by four photo-transistors 24 arranged at intervals of 90 degrees in a circle against one LED 25.

It will be understood from the foregoing description that according to the present invention, there is provided a power supply system for the automotive parts having a rotary component in which a signal is transmitted without using any leading wire between the rotor side and stator side, and that, power is stably and efficiently supplied without any leading wire, thus providing a reliable, durable and maintenance-free power supply system for rotary components of the automobile which is capable of transmitting various types of signals on the one hand and does not consume the automotive battery unnecessarily even when power is supplied constantly on the other hand.

What is claimed is:

1. A system for supplying electric power to automotive parts having a rotary component and a stationary component, the system comprising:
   a first coil fixed on the stationary component;
   a second coil fixed on the rotary component in opposition to said first coil;
   means for supplying an AC voltage to said first coil;
   means for rectifying the AC voltage induced in said second coil into a DC voltage;
   signal generating means connected to said means for rectifying;
   first spatial transmission means for transmitting a signal generated by said signal generating means from said rotary component to said stationary component, said first spatial transmission means being connected to said signal generating means;
   second spatial transmission means for receiving a signal transmitted by said first transmission means, said second spatial transmission means being fixed on said stationary component; and
   means for intensifying an excitation of said first coil for a predetermined length of time immediately following the generation of said signal and weakening said excitation for the remaining time, said means for intensifying being connected between said second spatial transmission means and said first coil, whereby said electric power is changed for said predetermined length of time.

2. A system according to claim 1, wherein said signal is an optical signal.

3. A system according to claim 1, wherein said signal is an ultrasonic wave.

4. A system according to claim 1, wherein said signal is an electromagnetic induction signal.

5. A system according to claim 1, wherein said rotary component is a tire of an automobile.

6. A system for supplying electric power between a rotary steering wheel used as an automotive part and a stationary component, the system comprising:
   a first coil fixed on the stationary component;
   a second coil fixed on the steering wheel in opposition to said first coil;
   means for supplying an AC voltage to said first coil; and
   means for rectifying the AC voltage induced in said second coil into a DC voltage.

7. A system according to claim 6, wherein said steering wheel includes signal generator means, said steering wheel and said stationary component include spatial transmission means for transmitting said signal from said steering wheel to said stationary component, and said stationary component includes means for intensifying an excitation of said first coil for a predetermined length of time immediately following the generation of said signal and a weakening said excitation for the remaining time.

8. A system according to claim 6, wherein said signal is an optical signal.

9. A system according to claim 6, wherein said signal is an ultrasonic wave.

10. A system according to claim 6, wherein said signal is an electromagnetic induction signal.

* * * * *